United States Patent [19]

Gut et al.

[11] Patent Number: 5,003,880
[45] Date of Patent: Apr. 2, 1991

[54] PROCESS FOR THE IMPACT HEALING OF INNER DISCONTINUITIES OR DEFECTS IN THE SUB-SURFACE REGION OF A CAST COMPONENT

[75] Inventors: Karl Gut, Benken; Wolfgang A. Matejka, Uhwiesen; Walter Gysel, Schaffhausen; Urs Gerber, Flurlingen, all of Switzerland

[73] Assignee: Georg Fischer AG, Schaffhausen, Switzerland

[21] Appl. No.: 181,563

[22] Filed: Apr. 14, 1988

[30] Foreign Application Priority Data

Apr. 14, 1987 [CH] Switzerland .................. 01437/87

[51] Int. Cl.⁵ ........................................ F42B 3/00
[52] U.S. Cl. ............................. 102/314; 102/312; 102/313; 102/325; 72/706
[58] Field of Search ............. 102/312, 313, 325, 314; 29/421.2; 72/706

[56] References Cited

U.S. PATENT DOCUMENTS

| 3,734,018 | 5/1973 | Gillingham | 102/20 |
| 3,781,966 | 1/1974 | Lieberman | 29/421.2 X |
| 4,184,430 | 1/1980 | Mock | 102/24 R |
| 4,323,117 | 4/1982 | Pierce | 102/307 X |
| 4,359,246 | 11/1982 | Ricketts | 102/312 X |
| 4,457,151 | 7/1984 | Mettler | 29/421.2 X |
| 4,494,392 | 1/1985 | Schroeder | 29/421.2 X |
| 4,624,307 | 11/1986 | Kinley | 102/531 X |
| 4,640,192 | 2/1987 | Nash | 102/307 |
| 4,685,205 | 8/1987 | Schroeder et al. | 72/706 X |
| 4,879,890 | 11/1989 | Hardwick | 72/706 X |

Primary Examiner—Peter A. Nelson
Attorney, Agent, or Firm—Bachman & LaPointe

[57] ABSTRACT

A process for the impact healing of inner discontinuities or defects in the surface area of a cast workpiece where the defects are localized comprises locating an explosive charge on the surface of the workpiece over the inner discontinuities or defects and detonating the explosive charge.

13 Claims, 1 Drawing Sheet

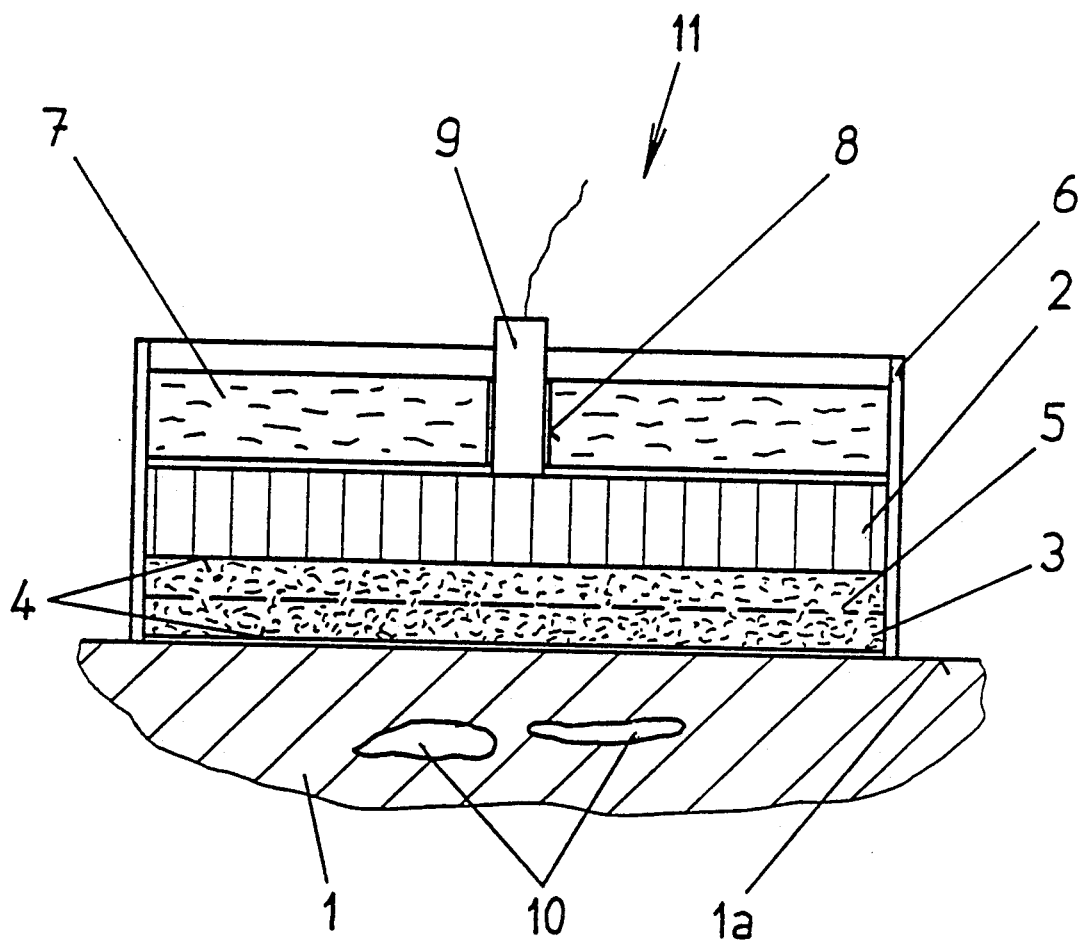

PROCESS FOR THE IMPACT HEALING OF INNER DISCONTINUITIES OR DEFECTS IN THE SUB-SURFACE REGION OF A CAST COMPONENT

BACKGROUND OF THE INVENTION

The invention relates to a process for the impact healing of inner discontinuities or defects in the sub-surface region of a cast component.

Steel castings, in particualr large castings weighing several tons, may be affected by inhomogeneities such as hot tear zones or other defects, in particualr in sub-surface region, due to uneven cooling, insufficient saturation, unfavorable casting shape or casting material inhomogeneities. Such defects, for example not completely rehealed hot tears, i.e. with small discontinuities, for example in planar arrangement, in the microstructure, can be detected for example by ultrasonic testing method. If the strength or the function of the casting is brought into doubt or reduced by such discontinuities, the casting is either lost or the discontinuities have to be eliminated.

A known process for eliminating discontinuities consists of removing the discontinuities by grinding or machining and filling the excavated areas by welding, followed by a subsequent post weld heat-treatment.

It is the object of the present invention to eliminate also large-planar discontinuities not in connection with the surface of the workpiece without having to intervene directly in the casting, that is, to create a process which can be applied externally.

The foregoing object is achieved by the process of the present invention wherein in the region of detected defects such as discontinuities an explosive charge is applied to the surface of the workpiece over the discontinuities and detonated. The workpiece can also be locally preheated, depending on material properties.

BRIEF DESCRIPTION OF THE DRAWINGS

The FIGURE is a schematic illustration of an explosive charge used in the process of the present invention.

DETAILED DESCRIPTION

The object of the present invention is achieved with the use of an explosive charge, for example an explosive compound, for the subsequent impact healing of the inner discontinuities. It has been found that if a strong impulse is made to act on the surface region lying above the discontinuities, the discontinuities can be healed in a satisfactory way with and without local preheating of the workpiece by local deformation.

In the case of a particularly preferred embodiment of the process, an insulating, refractory filling compound which is as plastically deformable as possible is laid between the explosive charge and the workpiece surface.

First of all, in accordance with the invention, the discontinuities must be found and localized. This usually takes place by means of ultrasonic testing, a widespread nondestructive testing process for the determination of cracks and discontinuities in workpieces.

Depending on the material, the casting can then be heated by suitable means in the region of such defects before the actual detonating of the charge. However, the preheating may also be dispensed with, for example in the case of austenitic steels. The heating is performed by means of resistance heating or by the flame of a welding torch, depending on the shape of the casting and the position and size of the defects. Heating of the defective region to 300°–1000° C. has provided particualarly suitable in the case of ferritic steels. The choice of pre-heating temperatures is influenced primarily by the position of the brittle fracture temperature of the materials to be deformed, i.e. the preheating temperature should be about 50 to 100° C. above the brittle fracture temperature or in the upper shelf of the notched bar impact energy. However, it may also be governed by the most favorable hot working or formability temperature of the workpiece to be deformed.

The explosive charge, for example, in the form of an explosive package, is placed over the place to be deformed. In order to obtain an ideal impulse transfer from the detonating explosive to the casting, the explosive compound should be in contact with the casting as air free as possible.

This contact is performed for example by means of a clay layer which can adapt on the one hand to the flat underside of the explosive compound and on the other hand to the, in some cases, freely convex or structured surface of the casting. In order to protect the explosive compound from the effect of heat due to the heated casting surface, a foil, preferably consisting of aluminum, is laid as thermal radiation and/or moisture protection barrier preferably both between workpiece surface and clay layer and between the clay layer and the explosive compund.

The clay layer can additionally be protected by a wire or glass fiber mesh, which, for example, lies approximately in the middle of the clay layer.

The thus constructed clay-adhesive compound body is preferably enclosed at the sides by a jacket, the height of which is greater than that of the explosive compound with clay layer. The explosive compound is covered at the top by laying a suitable closure compound, for example a cover, which is provided with a clearance for receiving the fuse for the explosive charge. This fuse is finally intorduced and remotely fired.

The explosive compound preferably has a detonation speed equivalent to the speed of sound in the casting to be treated, in other words about 5600 m/s in the case of ferritic steels.

The charge density, i.e. explosive compound per unit of effective area, is preferably from 0.5 to 1.5 g/cm$^2$, according to the depth and extent of the discontinuities. Consequently, with explosive quantities of up to 200 g, discontinuities over large areas of up to about 150×150 mm can be healed in one operation.

The effect of the process of the present invention can be verified for example by an ultrasonic inspection subsequently carried out after the explosion healing and the process repeated if necessary with changed apportionment of explosive if healing does not completely take place in the first operation.

The above description assumes an explosive charge in the form of actual compounds. It is conceivable that appropriate explosive volumes of liquid or gas could also be used instead of such explosive compounds.

In the single figure of the drawing, an embodiment of an apparatus for implementing the process according to the invention, i.e. an explosion impact healing compacting device is shown purely diagrammatically.

The drawing shows the device, i.e. the explosion compacting device 11 placed on a casting 1 above a flaw 10. The device 11, bound at the sides by a sheathing jacket 6, for example of mineral fiber, has, as means of thermal insulation and moisture protection, a foil 4, which is laid directly on the casting surface 1a, and directly above it a clay layer 3 with a wire or glass fiber mesh 5 introduced for its support. Futhermore, a thermal or moisture protection foil 4 is laid between the clay layer 3 and the explosive compound 2 as well as, an upper closure, a cover 7 with an opening 8 for the introduction of a fuse 9.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for the impact healing of inner discontinuities present in sub-surface areas of a cast metal component comprising providing a cast metal component having inner discontinuities in sub-surface area thereof, locating an explosive charge on the surface of the cast metal component over the inner discontinuities and detonating said explosive charge whereby said inner discontinuities are substantially healed without destruction of the cast metal component.

2. A process according to claim 4 including heating the cast metal component locally in the region of the inner discontinuities prior to detonating said explosive charge.

3. A process according to claim 1 including arranging a filling compound between the explosive charge and the surface of the cast metal.

4. A process according to claim 3 including filling the space between the explosive charge and the surface of the cast metal component with the filling compound.

5. A process according to claim 3 including providing a filling compound which is a plastically deformable, refractory and insulating compound.

6. A process according to claim 1 including arranging a thermal barrier between the explosive charge and the surface of the cast metal component.

7. A process according to claim 3 including providing a thermal barrier between the surface of the cast metal component and the filling compound between the filling compound and the explosive charge.

8. A process according to claim 3 including providing a wire mesh material for supporting the filling compound.

9. A process according to claim 5 including providing a clay compound as the filling compound.

10. A process according to claim 6 including providing a radiation protection foil as the thermal barrier.

11. A process according to claim 6 including providing a moisture protection foil as the thermal barrier.

12. A process according to claim 1 including providing a cast steel component.

13. A process according to claim 12 including a cast steel component having a cubic-face centered lattice crystal structure.

* * * * *